US010015115B2

(12) United States Patent
Ranganathan et al.

(10) Patent No.: US 10,015,115 B2
(45) Date of Patent: Jul. 3, 2018

(54) SOFTWARE DEFINED NETWORKING SERVICE CONTROL SYSTEMS AND METHODS OF REMOTE SERVICES

(71) Applicant: Ciena Corporation, Hanover, MD (US)

(72) Inventors: Raghuraman Ranganathan, Bellaire, TX (US); Lyndon Yee Ling Ong, Sunnyvale, CA (US)

(73) Assignee: Ciena Corporation, Hanover, MD (US)

( * ) Notice: Subject to any disclaimer, the term of this patent is extended or adjusted under 35 U.S.C. 154(b) by 92 days.

(21) Appl. No.: 14/726,708

(22) Filed: Jun. 1, 2015

(65) Prior Publication Data

US 2016/0352653 A1 Dec. 1, 2016

(51) Int. Cl.
*H04L 12/931* (2013.01)
*H04L 12/935* (2013.01)
*H04L 12/911* (2013.01)

(52) U.S. Cl.
CPC ............ *H04L 49/30* (2013.01); *H04L 47/781* (2013.01)

(58) Field of Classification Search
CPC .............................. H04L 49/351; H04L 49/30
USPC ....................................... 370/251, 254, 401
See application file for complete search history.

(56) References Cited

U.S. PATENT DOCUMENTS

| 7,164,679 | B2 | 1/2007 | Kotha et al. |
| 8,009,681 | B2 | 8/2011 | Ong et al. |
| 8,045,481 | B2 | 10/2011 | Ong et al. |
| 8,112,545 | B1 | 2/2012 | Ong |
| 8,433,192 | B2 | 4/2013 | Frankel et al. |
| 8,467,375 | B2 | 6/2013 | Blair |
| 8,531,969 | B2 | 9/2013 | Ong |
| 8,606,105 | B2 | 12/2013 | Ong |
| 8,724,505 | B2 | 5/2014 | Ong |
| 8,929,254 | B2 | 1/2015 | Hu et al. |
| 8,942,226 | B2 | 1/2015 | Ong |
| 2007/0201383 | A1 | 8/2007 | Ong et al. |
| 2008/0175154 | A1 | 7/2008 | Ong et al. |
| 2011/0085557 | A1* | 4/2011 | Gnanasekaran ...... H04L 45/583 370/401 |
| 2013/0028091 | A1 | 1/2013 | Sun et al. |
| 2013/0060929 | A1 | 3/2013 | Koponen et al. |
| 2013/0329734 | A1 | 12/2013 | Chesla et al. |

(Continued)

OTHER PUBLICATIONS ("OpenFlow Table Type Patterns" Open Networking Foundation, Version No. 1.0, Aug. 15, 2014).*

(Continued)

*Primary Examiner* — Melvin Marcelo
*Assistant Examiner* — Natali N Pascual Peguero
(74) *Attorney, Agent, or Firm* — Clements Bernard Walker PLLC; Christopher L. Bernard; Lawrence A. Baratta, Jr.

(57) ABSTRACT

A Software Defined Networking (SDN) controller is described associated with a local domain and configured to control remote services in a remote domain. The SDN controller includes a network interface communicatively coupled to the remote domain; a processor communicatively coupled to the network interface; and memory storing instructions that, when executed, cause the processor to, subsequent to instantiation of a logical switch in a device in the remote domain, establish a control channel with the logical switch, wherein the control channel flows over the local domain and the remote domain, and control the logical switch in the remote domain via the control channel.

20 Claims, 14 Drawing Sheets

(56) References Cited

U.S. PATENT DOCUMENTS

| | | | |
|---|---|---|---|
| 2014/0098710 A1 | 4/2014 | Ong | |
| 2014/0112190 A1 | 4/2014 | Chou et al. | |
| 2014/0301192 A1 | 10/2014 | Lee et al. | |
| 2014/0362790 A1* | 12/2014 | McCann | H04W 40/248 370/329 |
| 2015/0244607 A1* | 8/2015 | Han | H04L 45/02 370/254 |
| 2016/0014007 A1* | 1/2016 | Karame | H04L 43/0864 370/252 |
| 2016/0359676 A1* | 12/2016 | Ceccarelli | H04L 41/0677 |

OTHER PUBLICATIONS

MEF Technical Specification MEF 10.3 ("Ethernet Services Attributes Phase 3" Oct. 2013 hereinafter NPL2).*

ETSI GS NFV 001 ("Network Functions Virtualisation (NFV); Use Cases" V1.1.1 Oct. 2013).*

Perello, et al., "Scalable Path Computation Flooding Approach for PCE-Based Multi-domain Networks," ETRI Journal, vol. 32, No. 4, Aug. 2010, pp. 622-625.

Ong, Lyndon, "Multi-Domain PCE and Other Trends in the Control Plane," Ciena Corporation, Mar. 2012, pp. 1-18.

Ong, Lyndon, "Ciena's Intelligent Optical Network Deployment and Directions," Ciena Corporation, Dec. 2, 2009, pp. 1-21.

Parulkar, et al., "Packet and Circuit Convergence with OpenFlow," Stanford Clean Slate Program, pp. 1.

Das et al., "Packet and Circuit Network Convergence with OpenFlow," pp. 1-3.

McKeown, et al., "OpenFlow: Enabling Innovation in Campus Networks," Mar. 14, 2008, pp. 1-6.

"Network Functions Virtualisation (NFV); Use Cases," ETSI GS NFV 001 V1.1.1, Oct. 2013, pp. 1-50.

"OpenFlow Management and Configuration Protocol (OF-Config 1.1)," Open Networking Foundation, Jun. 25, 2012, pp. 1-117.

"OpenFlow Management and Configuration Protocol," Open Networking Foundation, 2014, pp. 1-44.

"OpenFlow Configuration and Management Protocol OF-Config 1.0," Open Networking Foundation, pp. 1-74.

Doria et al., "General Switch Management Protocol (GSMP) Applicability," Network Working Group, Jun. 2002, pp. 1-9.

Doria et al., "Forwarding and Control Element Separation (ForCES) Protocol Specification," Internet Engineering Task Force (IETF), Mar. 2010, pp. 1-124.

"CPE WAN Management Protocol," Technical Report, CPE WAN Management Protocol, pp. 1-109.

* cited by examiner

SOFTWARE DEFINED NETWORKING SERVICE CONTROL SYSTEMS AND METHODS OF REMOTE SERVICES

FIELD OF THE DISCLOSURE

The present disclosure generally relates to networking systems and methods. More particularly, the present disclosure relates to Software Defined Networking (SDN) service control systems and methods of remote services located outside a service provider's domain.

BACKGROUND OF THE DISCLOSURE

Conventionally, a Service Provider (SP) may have customers for network services which are located in another network domain. For example, a customer may be located in an Access Provider (AP) domain; the SP must reach the customer via equipment hosted by the AP, and the network services may include packet services. Conventionally, an SP must reach the customers with equipment that is hosted by the AP. For example, one type of equipment may include a Virtual Network Interface Device (vNID) such as described in the Metro Ethernet Forum (MEF, metroethernetforum.org) Technical Specification MEF 43 entitled "Virtual NID (vNID) Functionality for E-Access Services," April, 2014, the contents of which are incorporated by reference. In such cases, the services offered to the customer may be limited by the capabilities of the particular equipment that has been deployed by the AP and cannot be easily changed by the SP. The SP may be able to configure some aspects of the equipment behavior using a Remote Management Interface (RMI), such as the speed or bandwidth profile to be selected for the user, but this is limited to the options that have been predefined for the equipment or the SP must contact the AP in order to get more significant changes made, adding delay and cost to the service. MEF 43 describes the present state-of-the-art for SP control of services offered to a remote user. MEF 43 describes a management interface between the SP and the vNID across a boundary between the AP and the SP, to configure a static set of objects supported by the vNID. However, MEF 43 is restricted to Ethernet (ETH) layer functions related to a MEF Service at a User-Network Interface (UNI) on the network side, i.e., an UNI-N (network side of UNI).

Software Defined Networking (SDN) is an emerging framework which includes a centralized control plane decoupled from the data plane. In SDN, network services are managed through abstraction of lower-level functionality by decoupling the system that makes decisions about where traffic is sent (the control plane) from the underlying systems that forward traffic to the selected destination (the data plane). The SDN architecture is: (i) directly programmable: network control is directly programmable because it is decoupled from forwarding functions; (ii) agile: abstracting control from forwarding lets administrators dynamically adjust network-wide traffic flow to meet changing needs; (iii) centrally managed: network intelligence is (logically) centralized in software-based SDN controllers that maintain a global view of the network, which appears to applications and policy engines as a single, logical switch; (iv) programmatically configured: SDN lets network managers configure, manage, secure, and optimize network resources very quickly via dynamic, automated SDN programs, which they can write themselves because the programs do not depend on proprietary software; and (v) open standards-based and vendor-neutral: when implemented through open standards, SDN simplifies network design and operation because instructions are provided by SDN controllers instead of multiple, vendor-specific devices and protocols.

The components in SDN include an SDN application, an SDN controller, an SDN data path, a control to data plane interface, and northbound interfaces. SDN applications are programs that explicitly, directly, and programmatically communicate their network requirements and desired network behavior to the SDN controller via the northbound interface (NBI). The SDN controller is a logically centralized entity in charge of (i) translating the requirements from the SDN application layer down to the SDN data paths and (ii) providing the SDN applications with an abstract view of the network (which may include statistics and events). The SDN datapath is a logical network device that exposes visibility and uncontended control over its advertised forwarding and data processing capabilities. The SDN CDPI is the interface defined between an SDN controller and an SDN data path, which provides at least (i) programmatic control of all forwarding operations, (ii) capabilities advertisement, (iii) statistics reporting, and (iv) event notification. SDN NBIs are interfaces between SDN applications and SDN controllers and typically provide abstract network views and enable direct expression of network behavior and requirements. Exemplary SDN protocols and the like include OpenFlow (www.opennetworking.org/sdn-resources/onf-specifications/openflow/), General Switch Management Protocol (GSMP) defined in RFC 3294 (June 2002), and Forwarding and Control Element Separation (ForCES) defined in RFC 5810 (March 2010), the contents of all are incorporated by reference herein.

SDN Controllers, SDN Southbound Interfaces, such as OpenFlow, support finer-grained control over the forwarding tables and packet or circuit processing done by a logical switch such as an OpenFlow Logical Switch (OLS) than vNID control in MEF 43. However, SDN control assumes that all devices are in a same domain, i.e., an SDN controller conventionally only controls switches in a single domain.

The Broadband Forum has a Technical Report TR-069 entitled "CPE WAN Management Protocol v.1.1," December, 2007, the contents of which are incorporated by reference. TR-069 has specified remote configuration and service provisioning of a Customer Premises Equipment (CPE) along with communication with an Auto-Configuration Server. ETSI has published a Group Specification ETSI GS NFV 001 entitled "Network Functions Virtualization (NFC); Use Cases," October, 2013, the contents of which are incorporated by reference. ETSI GS NFV 001 identifies Network Functions Virtualization Infrastructure (NFVI) as a service where virtual instances may be in the infrastructure of another provider.

Disadvantageously, present state of the art only allows the SP to configure a set of objects related only to a specific layer such as the ETH layer functions in a vNID (MEF 43) or the Asynchronous Transfer Mode (ATM) layer in a CPE (TR-069) in order to control the service offered to the user. Also, these have limited flexibility for the SP to change service characteristics without further involving the AP to modify or replace the equipment at the UNI. While SDN approaches such as OpenFlow offer much finer grained and more flexible control of the service, including adaptation from one layer or encapsulation to another, it is currently defined for a single domain only.

BRIEF SUMMARY OF THE DISCLOSURE

In an exemplary embodiment, a Software Defined Networking (SDN) controller associated with a local domain and configured to control remote services in a remote domain includes a network interface communicatively coupled to the remote domain; a processor communicatively coupled to the network interface; and memory storing instructions that, when executed, cause the processor to, subsequent to instantiation of a logical switch in a device in the remote domain, establish a control channel with the logical switch, wherein the control channel flows over the local domain and the remote domain, and control the logical switch in the remote domain via the control channel. The logical switch can be an OpenFlow Logical Switch and the control channel is an OpenFlow control channel. The OpenFlow Logical Switch can support a required Table Typing Pattern that specifies a table structure in OpenFlow to support a service. The logical switch can be implemented by a processor executing a Virtual Network Function (VNF). The control channel can traverse External Network-Network Interface (ENNI) ports between the local domain and the remote domain, and wherein the control channel can include one or more of an OpenFlow control channel, an Ethernet Virtual Connection, an Internet Protocol (IP) tunnel, and an Optical channel Data Unit (ODU) connection between the SDN controller and the logical switch.

The control of the logical switch can include one or more of control of resource reservation for the control channel by the SDN controller, control of resource reservation for the control channel and data flow by the SDN controller, and control of resource reservation in the local domain by sending allocation requests to a device in the local domain and relying on a control plane in the local domain to carry out the allocation requests. The logical switch can be controlled by the SDN controller and in combination with a second controller in the remote domain, the second controller acts as a Remote Management Interface for the control channel. The logical switch can be controlled by the SDN controller and in combination with a second controller in the remote domain, the second controller acts as a Remote Processing Element that proxies control messages from the control channel. The instantiation of the logical switch can be performed by one of the SDN controller configured to identify a User-Network Interface (UNI) port with a second controller in the remote domain to cause the second controller to instantiate the logical switch at the UNI port, and the SDN controller configured to instantiate a Virtual Network Function (VNF) for the logical switch at the UNI port. The control channel can be one of a separate traffic class, and combined with other data flows as another bandwidth profile flow within an envelope.

In another exemplary embodiment, a method for Software Defined Networking (SDN) control of remote services in a remote domain by an SDN controller associated with a local domain includes, subsequent to instantiation of a logical switch in a device in a remote domain, establishing a control channel with the logical switch, wherein the control channel flows over the local domain and the remote domain; and controlling the logical switch in the remote domain via the control channel. The logical switch can be an OpenFlow Logical Switch and the control channel is an OpenFlow control channel. The OpenFlow Logical Switch can support a required Table Typing Pattern that specifies a table structure in OpenFlow to support a service. The logical switch can be implemented by a processor executing a Virtual Network Function (VNF). The control channel can traverse External Network-Network Interface (ENNI) ports between the local domain and the remote domain, and wherein the control channel can include one or more of an OpenFlow control channel, an Ethernet Virtual Connection, an Internet Protocol (IP) tunnel, and an Optical channel Data Unit (ODU) connection between the SDN controller and the logical switch.

The controlling of the logical switch can include one or more of controlling resource reservation for the control channel by the SDN controller, controlling resource reservation for the control channel and data flow by the SDN controller, and controlling resource reservation in the local domain by sending allocation requests to a device in the local domain and relying on a control plane in the local domain to carry out the allocation requests. The logical switch can be controlled by the SDN controller and in combination with a second controller in the remote domain, the second controller acts as a Remote Management Interface for the control channel. The logical switch can be controlled by the SDN controller and in combination with a second controller in the remote domain, the second controller acts as a Remote Processing Element that proxies control messages from the control channel. The instantiation of the logical switch can be performed by one of the SDN controller identifying a User-Network Interface (UNI) port with a second controller in the remote domain to cause the second controller to instantiate the logical switch at the UNI port, and the SDN controller instantiating a Virtual Network Function (VNF) for the logical switch at the UNI port.

In a further exemplary embodiment, a switch located in a remote domain and controlled by a Software Defined Networking (SDN) controller located in a local domain includes one or more logical switches, each of the one or more logical switches is a logical partition of a physical switch segmented into separate switching domains, each of the one or more logical switches forward traffic independently of one another; wherein, subsequent to instantiation of a logical switch of the one or more logical switches, a control channel is established with the SDN controller in the local domain, wherein the control channel flows over the local domain and the remote domain, and wherein the logical switch is controlled by the SDN controller in the local domain via the control channel.

BRIEF DESCRIPTION OF THE DRAWINGS

The present disclosure is illustrated and described herein with reference to the various drawings, in which like reference numbers are used to denote like system components/method steps, as appropriate, and in which:

FIG. 12 is a block diagram of an exemplary implementation of a switch which can be used to realize the Customer Equipment (CE) in the network of FIG. 1 and the like;

DETAILED DESCRIPTION OF THE DISCLOSURE

Figure 1:
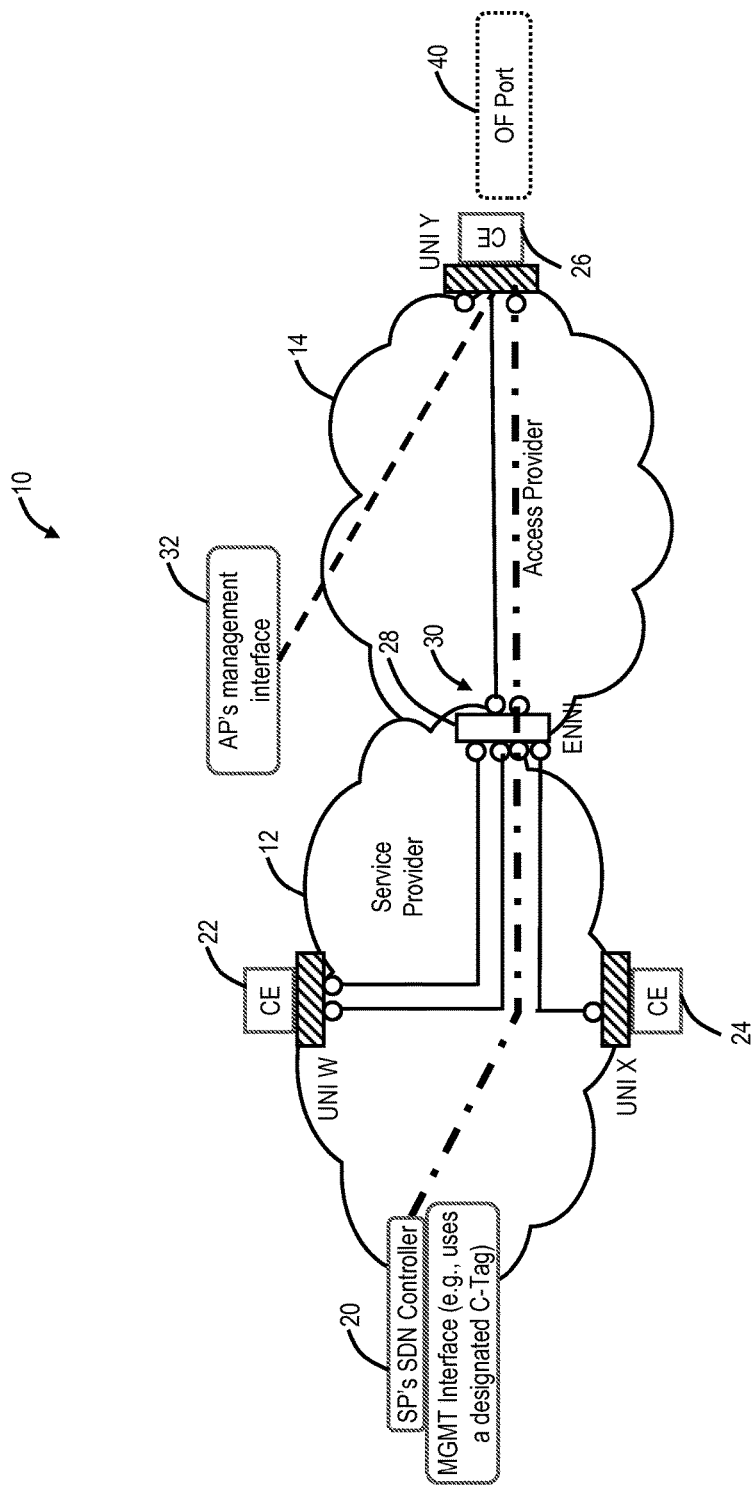
FIG. 1 is a network diagram of a network with two domains illustrating an operational environment for SDN service control from a local domain of remote services located in a remote domain.

In various exemplary embodiments, SDN service control systems and methods are described to control remote services located outside a service provider's domain. The systems and methods enable a SP to offer different packet services to customers in a remote domain, e.g., the SP, using SDN concepts of a controller controlling forwarding tables and actions in a logical switch located at or close to a UNI in the remote domain. With remote SDN control, the SP has greater control granularity (relative to MEF 43 and the like described above) with an ability to modify services and/or path behavior, create new services, etc. without involving the AP. The SP domain includes an SDN controller that is able to control directly the forwarding tables and packet or circuit processing, such as encapsulation or adaptation, in a logical switch entity in the AP domain. The AP provides, through either hardware or software implementation, the logical switch entity with a port or ports facing the user that are controlled by an SDN interface. The AP then offers control channel connectivity, either directly or through an intervening Remote Processing Entity, between the SP SDN controller and the logical switch entity facing the user, allowing the SP SDN controller to direct the forwarding and packet or circuit processing of information coming from or going to the user. As described herein, the terms SP and AP are used for illustration purposes only. Generally, the SP can be referred to as a local domain, and the AP can be referred to as a remote domain. That is, the systems and methods contemplate operation across any domains and are not confined to SP and AP interconnectivity.

Advantageously, with the systems and methods, the SP can offer additional services (e.g., Layer 3 (L3)-Level 7 (L7) services) allowed by SDN control of logical switch actions at the UNI via remote configuration of the switch attributes. The SP can support MEF Services to out of footprint locations and add services (e.g., firewall, service mapping, etc.). One example of such configuration could be constrained forwarding such as for an E-Tree service instance as described in commonly-assigned U.S. Pat. No. 8,929,254 issued on Jan. 6, 2015 and entitled "SYSTEMS AND METHODS FOR CONSTRAINED FORWARDING BASED PACKET NETWORK CONNECTIVITY," the contents of which are incorporated by reference. Also, the logical switch can be a Packet-Optical Transport System (POTS) or Layer 1 cross connect (e.g., an Optical Transport Network (OTN)) and thus support other enhancements such as described in commonly-assigned U.S. Pat. No. 8,467,375 issued on Jun. 18, 2013 and entitled "HYBRID PACKET-OPTICAL PRIVATE NETWORK SYSTEMS AND METHODS," the contents of which are incorporated by reference. Additional, an SP's OpenFlow (OF) controller can control reservation of the path for control channel only as well as the data flow of services. The SP may also use a Path Computation and Control Element (PCCE), such as described in commonly-assigned U.S. Pat. No. 8,942,226 issued on Jan. 27, 2015 and entitled "SOFTWARE DEFINED NETWORKING SYSTEMS AND METHODS VIA A PATH COMPUTATION AND CONTROL ELEMENT," the contents of which are incorporated by reference, to compute path and using a head-end switch with distributed control plane to set up the path across both SP's network as well as a virtual slice of the AP's network that is under the control of the SP controller.

The SP control and management of a remote service (using a logical switch entity such as an OpenFlow Logical Switch (OFLS), instantiated and hosted by the AP, but controlled either directly or via an AP RPE) automates the service provisioning process across operator domain boundaries and supports finer-grained control over the forwarding and treatment of traffic to and from a particular user. The SP has the ability to configure the logical switch to offer additional services or to modify the offered service using an SDN RMI, such as tunneling of OpenFlow protocol messages through the AP. The systems and methods improve service definition flexibility, allowing the layer service to be changed through control of packet matching and forwarding actions without the time and expense of negotiation between the SP and AP. The systems and methods use an in-band RMI to manage/control an OFLS and/or OF Ports in another controller domain to automate network operator operations (and OPEX) across business boundaries, allowing SP SDN functionality to extend outside of the SP's domain.

The systems and method enable a peering relationship of the SP controller and the AP RPE located in different domains to improve the efficiency of control over large numbers of logical switch entities in the AP while making this transparent to the SP controller, as the AP RPE acts as a proxy function. The systems and methods also enable sharing of new service control functions between network operators (e.g., the SP Controller could request the RPE (AP's controller) to take on some tasks (e.g., process unknown packets) or have it passed to SP's controller for determining a future state of an OFLS (at a given UNI)) and this streamlines network operations (and OPEX) when handling large numbers of users and associated logical switch entities.

Referring to FIG. 1, in an exemplary embodiment, a network diagram illustrates a network 10 with two domains 12, 14 illustrating an operational environment for SDN service control from the domain 12 of remote services located in the domain 14. The domain 12 can be a first domain, an SP's domain, etc., and the domain 14 can be a second domain, an AP's domain, etc. The domain 12 includes an SDN controller 20, such as an OpenFlow controller, etc. which has an associated management interface which, for example, can utilize a designated tag (e.g., a customer tag (C-Tag)). In this example, the domain 12 includes Customer Equipment (CE) 22, 24 with associated UNI ports (labeled as UNI W on the CE 22 and UNI X on the CE 24). The domain 14 includes CE 26 with a UNI port (labeled UNI Y). Between the domains 12, 14, a node 28 includes External Network-Network Interface (ENNI) ports 30. Also, the domain 14 includes a management interface 32, which may or may not be SDN-based. As described herein, the CEs 22, 24, 26 and the node 28 are network elements, switches, routers, cross-connects, etc. configured to provide connectivity in the network 10 at one or more of Layers 0, 1, 2, and/or 3, i.e., optical, Time Division Multiplexing (TDM), Carrier Ethernet, Multiprotocol Label Switching (MPLS), Internet Protocol (IP), etc. Note, the CEs 22, 24, 26 and the node 28 operate under the control of the SDN controller 20. The CE 26 also can include an OpenFlow (OF) port 40 associated with the UNI Y.

Conventionally, the SDN controller 20 can only control the CEs 22, 24 since these devices are local in the same domain 12, and the CE 26 is solely under the control of the management interface 32. The ENNI ports 30 are a demarcation point between the domains 12, 14, i.e., between two Carrier Ethernet operators that connect their domains 12, 14 in order to provide end-to-end Ethernet services to subscribers. ENNI is defined in Technical Specification MEF 26.1 entitled "External Network Network Interface (ENNI)—Phase 2," January, 2012, the contents of which are incorporated by reference. Again, conventionally, for the domain 12 to control services associated with the CE 26, the SP must either (a) negotiate with the AP to make changes in the UNI Y service through the AP's management interface 32, or (b) use a Remote Management Interface (RMI) allowed by the AP, through the ENNI ports 30 to make changes in the CE 26 for the UNI Y. Again, these conventional techniques are burdensome, inefficient, and lack control.

Figure 2:
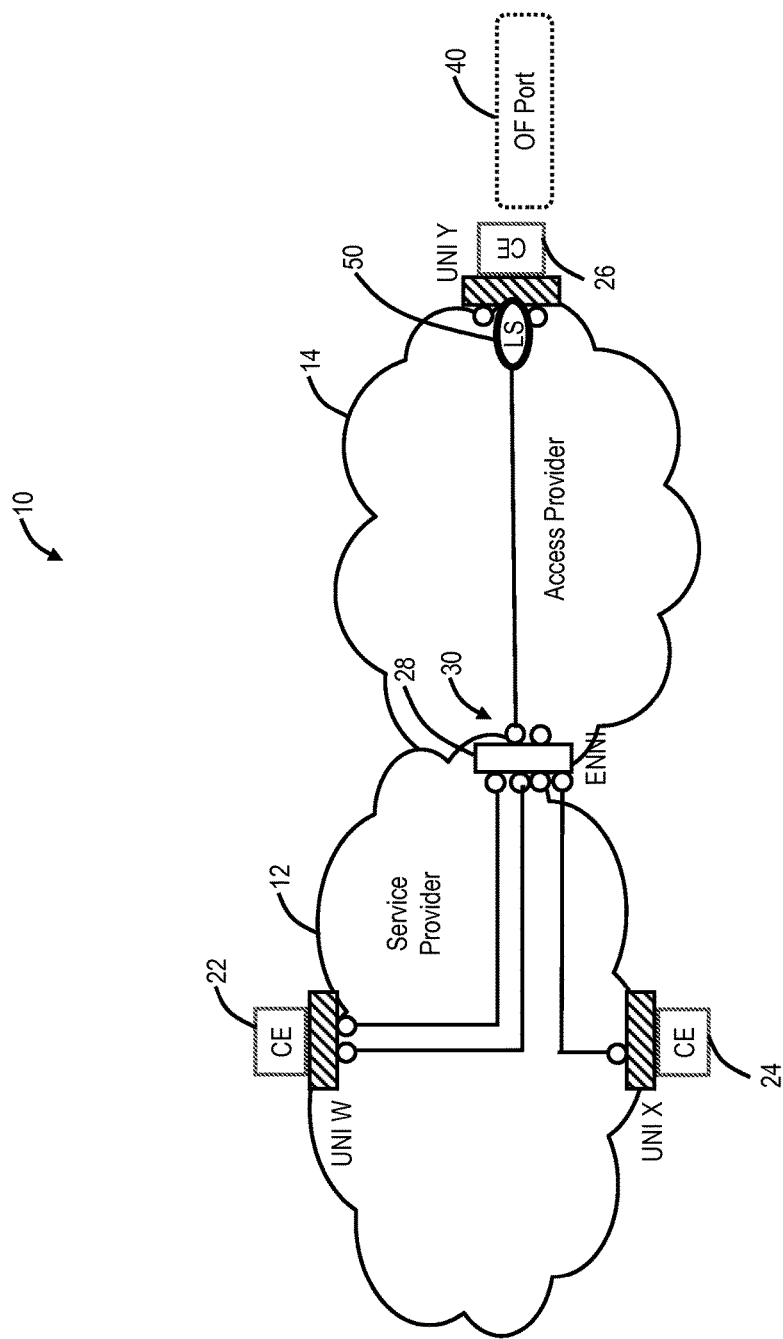
FIG. 2 is a network diagram of the network of FIG. 1 illustrating a logical switch instantiated at Customer Equipment (CE) in the remote domain for remote SDN control.

Referring to FIG. 2, in an exemplary embodiment, a network diagram illustrates the network 10 illustrating a logical switch 50 instantiated at the CE 26 for remote SDN control. The logical switch 50 can be referred to as a logical switch element, a logical switch entity, a virtual switch, etc. The logical switch 50 represents a logical partition of the physical switch, i.e., the CE 26, into separate switching domains; each logical switch 50 forwards traffic independently of the others, providing a unique mechanism for isolating user traffic that is superior to other available techniques. In the SDN service control systems and methods, by agreement between the SP and AP (i.e., the domains 12, 14), the domain 14 instantiates one or more logical switches 50 in the AP's domain 14, at customer facing points.

In an exemplary embodiment, the logical switch 50 is an OpenFlow Logical Switch (OFLS) supporting the OpenFlow control channel. An OFLS is a set of resources (e.g. ports) from an OpenFlow Capable Switch, which can be associated with a specific OpenFlow controller such as the SDN controller 20. Additional details of an OFLS are described in ONF TS-004 entitled "OpenFlow Configuration and Management Protocol" OF-CONFIG 1.0, ONF TS-005 entitled "OpenFlow Management and Configuration Protocol" OF-CONFIG 1.1, and ONF-TS-016 entitled "OpenFlow Management and Configuration Protocol" OF-CONFIG 1.2, the contents of each are incorporated by reference.

Also, the OF ports 40 are also described in OF-CONFIG 1.0, 1.1, and 1.2. An OpenFlow Port is a forwarding interface of an OpenFlow Logical Switch as described in the OpenFlow specification as the port component of an OpenFlow switch. An OpenFlow Port may map to a physical port on a physical switch or a logical port on a physical or virtual switch.

In another exemplary embodiment, the logical switch 50 is an OFLS supporting a required Table Typing Pattern that specifies a table structure in OpenFlow that is suitable to support a service controlled by the SDN controller 20. For example, to instantiate an OFLS, this can include instantiating the OFLS using a Table Typing Pattern (TTP) which meets the SDN controller 20's required match/action rules for the traffic flow through such an OFLS. TTPs are described in ONF TS-017 entitled "OpenFlow Table Type Patterns" Version No. 1.0, the contents of which are incorporated by reference.

A Table Type Pattern (TTP) is an abstract switch model that describes specific switch forwarding behaviors that an OpenFlow controller can program via the OpenFlow-Switch protocol. A TTP represents the flow processing capabilities of an OFLS. In declaring support for a particular TTP, an OFLS indicates support for all the required capabilities specified by the TTP and a negotiated subset of optional capabilities. In accepting a TTP, an SDN controller understands the valid commands for the OFLS are a constrained subset of the standard OpenFlow-switch protocol—that is, the OFLS is not required to accept commands that do not conform to the constraints specified by the TTP. An OpenFlow Capable Switch may support a number of TTPs, and an SDB controller may understand a number of TTPs, but only one TTP can be active for a given OFLS.

When using the TTP framework, the SDN controller 20 and the logical switch 50 agree on a specific TTP before the SDN controller 20 begins sending OpenFlow messages to the logical switch 50. This agreement may be implicit (i.e., each side is configured a priori) or negotiated before forwarding is enabled. The TTP framework can simplify the job of implementing an OpenFlow controller or OpenFlow agent for a switch. The TTP provides a description of the required switch behavior so that implementers can perform optimizations or deliver more complex forwarding behaviors (beyond what can be represented in a single OpenFlow table). A TTP specifies a set of flow tables and describes the valid flow table entries and group table entries for an OFLS. As the OpenFlow-Switch 1.x specification evolves and incorporates new objects, the TTP syntax must be updated to support them.

The TTPs can be used to model limitations and capabilities of the logical switch 50. The systems and methods described herein support multiple tables. For example, the SDN controller 20 and the logical switch 50 can support multiple tables, using TTP, such as for various different functions, e.g., Virtual Local Area Network (VLAN) filtering, Media Access Control (MAC) processing, managing different Layer flows such as modeling Layer 1 (Optical Transport Network (OTN) flows) and modeling Layer 2 (packet flows), etc.

In a further exemplary embodiment, the domain 14 can provide equipment, for the CE 26, with a generic processor at the UNI Y and the domain 12 instantiates a Virtual Network Function (VNF) supporting logical switch capability using an NFV infrastructure. In yet another exemplary embodiment, a VNF provides OpenFlow Logical Switch functionality including support for the OpenFlow control channel.

Figure 3:
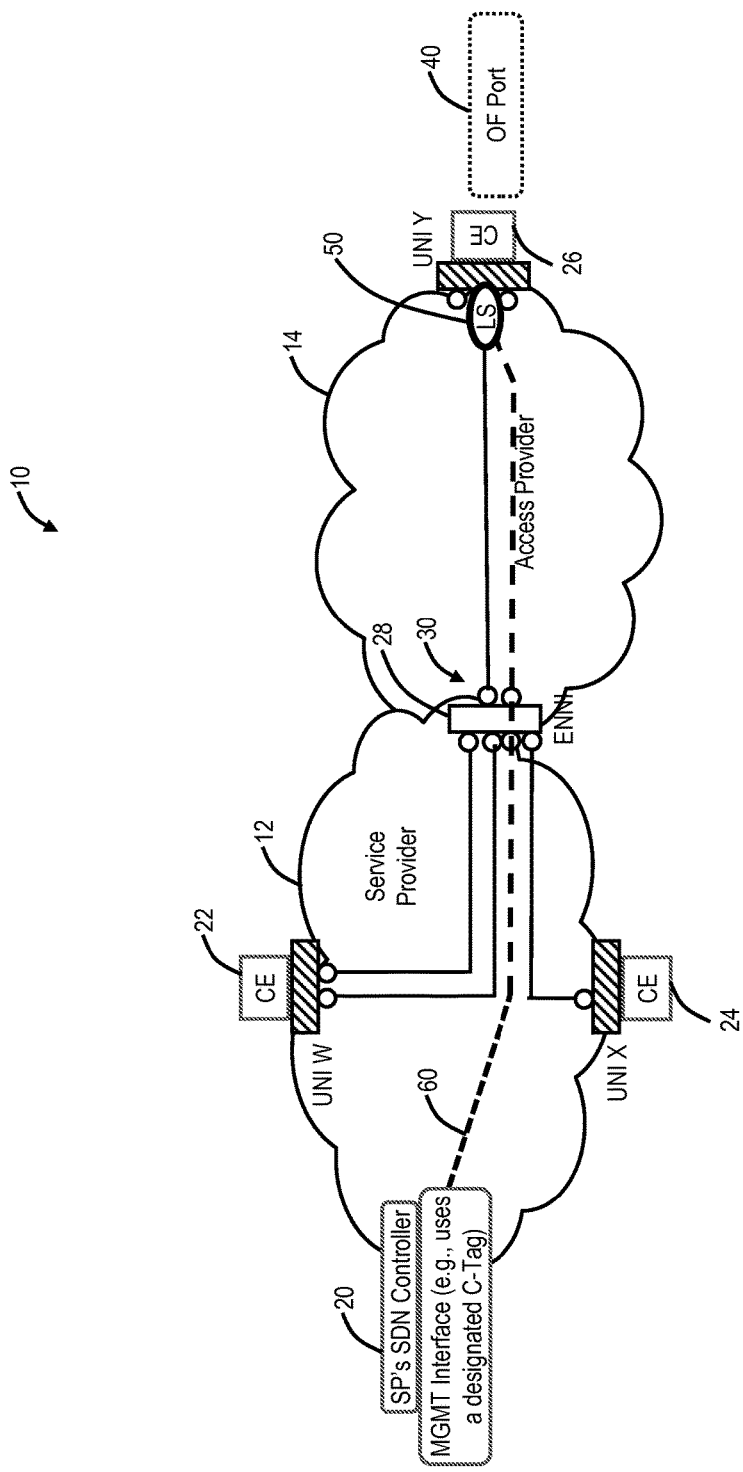
FIG. 3 is a network diagram of the network of FIG. 1 illustrating SDN control of the logical switch in the remote domain by the SDN controller in the local domain.

Referring to FIG. 3, in an exemplary embodiment, a network diagram illustrates the network 10 illustrating SDN control of the logical switch 50 in the domain 14 by the SDN controller 20 in the domain 12. The logical switch 50 is controlled by the SDN controller 20. Specifically, control traffic over a control channel 60 between the SDN controller 20 and the logical switch 50 flows in both the domains 12, 14 across the ENNI ports 30. In an exemplary embodiment, the control channel 60 can be an OpenFlow control channel which exchanges OpenFlow messages. In another exemplary embodiment, the control channel 60 is an Ethernet Virtual Connection. In a further exemplary embodiment, the control channel 60 is an IP tunnel such as IP Security (IPSEC). In a further exemplary embodiment, the control channel 60 can be any type of connection such as an Optical channel Data Unit level 0 (ODU0) or the like. The logical switch 50 can be configured to establish the control channel 60 with the SDN controller 20. Also, the control channel 60 can be a separate traffic class or combined with other data flows as another bandwidth profile within an envelope (i.e., these terms are defined in MEF Technical Specification MEF 10.3 "Ethernet Services Attributes Phase 3" (October 2013), the contents of which are incorporated by reference) for purposes of traffic management at various points in the network 10. The control channel 60 can additionally instantiate necessary protocols for the purposes of testing and monitoring a state of the user service.

Figure 4:
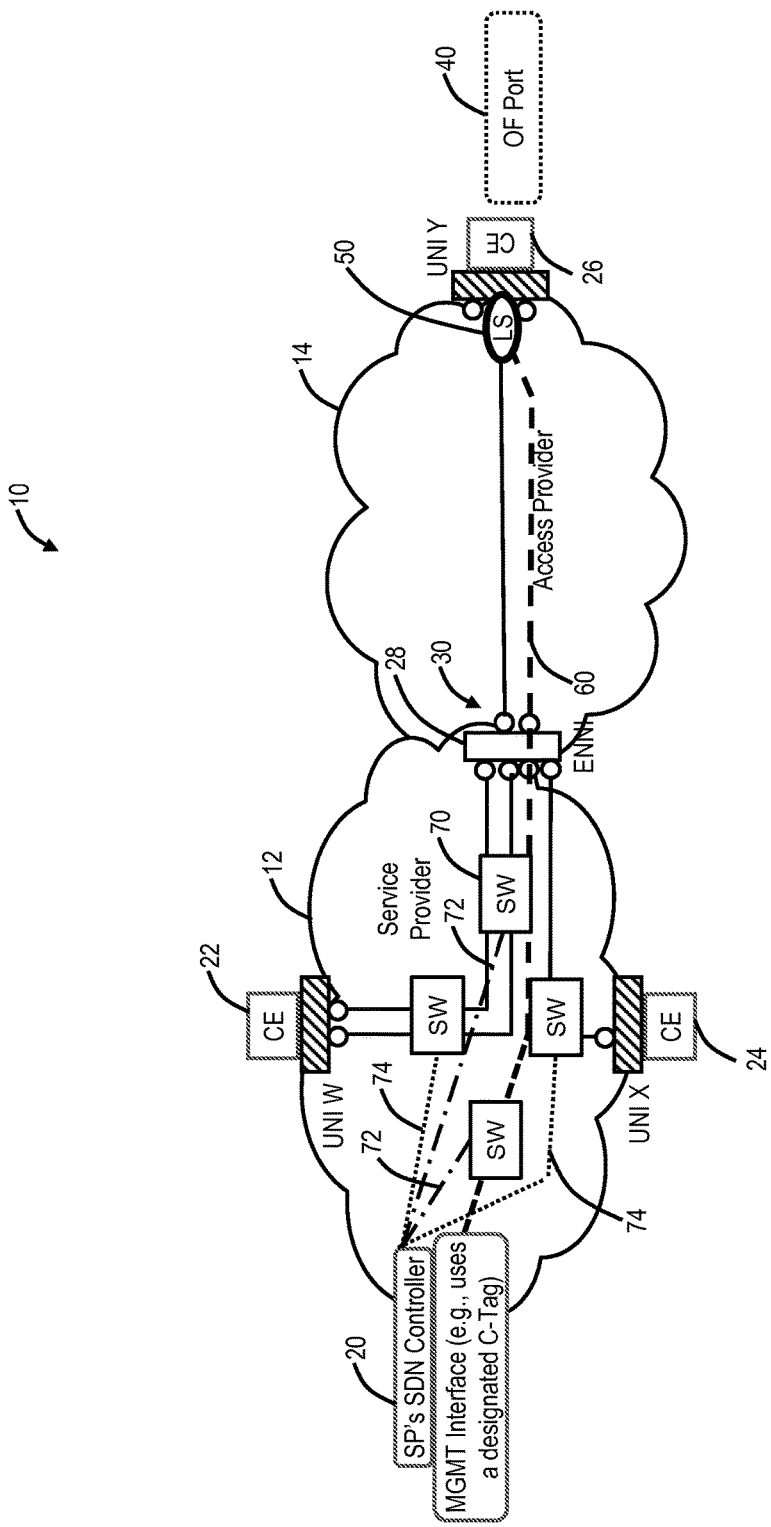
FIG. 4 is a network diagram of the network of FIG. 1 illustrating an exemplary control scheme for SDN control of the logical switch in the remote domain by the SDN controller in the local domain.

Referring to FIG. 4, in an exemplary embodiment, a network diagram illustrates the network 10 illustrating an exemplary control scheme for SDN control of the logical switch 50 in the domain 14 by the SDN controller 20 in the domain 12. Here, the domain 12 is shown with switches 70. In an exemplary embodiment, the SDN controller 20 also controls resource reservation for the control channel 60 at the intermediate switches using, e.g., OpenFlow control (labeled as lines 72). In another exemplary embodiment, the SDN controller 20 controls resource reservation for the data flow as well as the control channel 60 using, e.g., OpenFlow control (labeled as lines 74).

Figure 5:
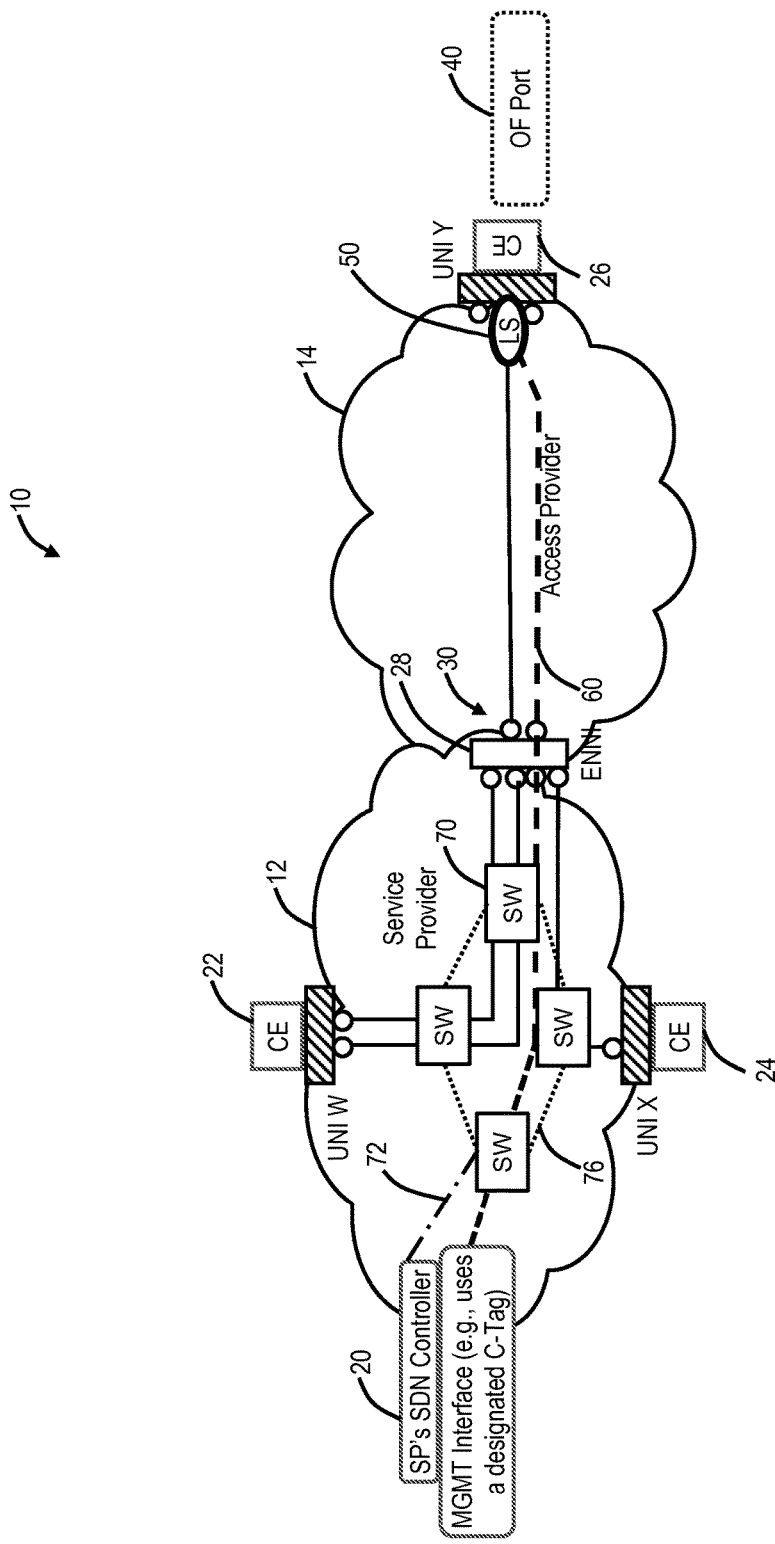
FIG. 5 is a network diagram of the network of FIG. 1 illustrating another exemplary control scheme for SDN control of the logical switch in the remote domain by the SDN controller in the local domain.

Referring to FIG. 5, in an exemplary embodiment, a network diagram illustrates the network 10 illustrating another exemplary control scheme for SDN control of the logical switch 50 in the domain 14 by the SDN controller 20 in the domain 12. In this exemplary embodiment, the SDN controller 20 controls the reservation of resources at the intermediate switches 70 by acting as a Path Computation and Control Element (PCCE), computing the path and sending the allocation request to the head-end switch (labeled as line 72), and then relying on existing distributed control plane (labeled as lines 76) to carry out the allocation request within the network.

The distributed control plane can include Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing and maintaining connections between nodes. Again, an exemplary embodiment of the PCCE is described in U.S. Pat. No. 8,942,226 referenced above.

Figure 6:
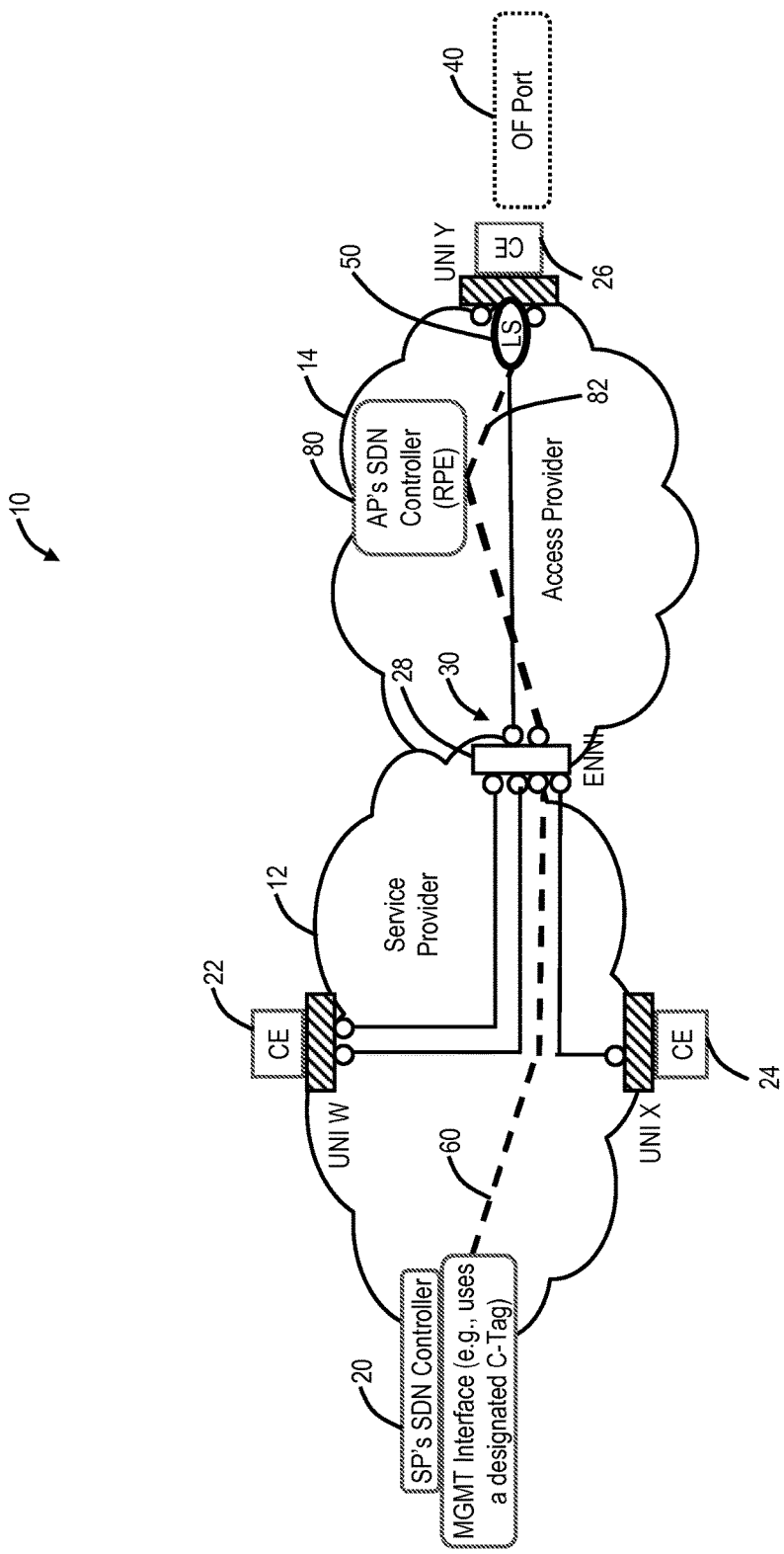
FIG. 6 is a network diagram of the network of FIG. 1 illustrating SDN control of the logical switch in the domain by a combination of the SDN controller in the local domain and an SDN controller in the remote domain.

Referring to FIG. 6, in an exemplary embodiment, a network diagram illustrates the network 10 illustrating SDN control of the logical switch 50 in the domain 14 by a combination of the SDN controller 20 in the domain 12 and an SDN controller 80 in the domain 14. Note, the exemplary embodiments of FIGS. 3-6 do not include an SDN controller in the domain 14. Here, in FIG. 6, the logical switch 50 is controlled by a combination of the SDN controller 20 and the SDN controller 80. Specifically, the domain 14 configures the flow of control traffic on the control channel 60 between the SDN controller 20 and the SDN controller 80 as a Remote Management Interface (RMI). In an exemplary embodiment, the RMI is an OpenFlow control channel and the SDN controller 80 acts as an intermediate OpenFlow controller. The SDN controller 80 acts as a Remote Processing Element (RPE) with control channels 82 to one or more logical switches 50 in the domain 14. The RPE proxies control messages from the SDN controller 20 to these subtending logical switches 50. Again, in an exemplary embodiment, the control channel 82 is an OpenFlow control channel, and the logical switch 50 is configured to establish a control session to the SDN controller 80. The RPE subtends the logical switch 50 and other logical switches to improve efficiency and speed.

Figure 7:
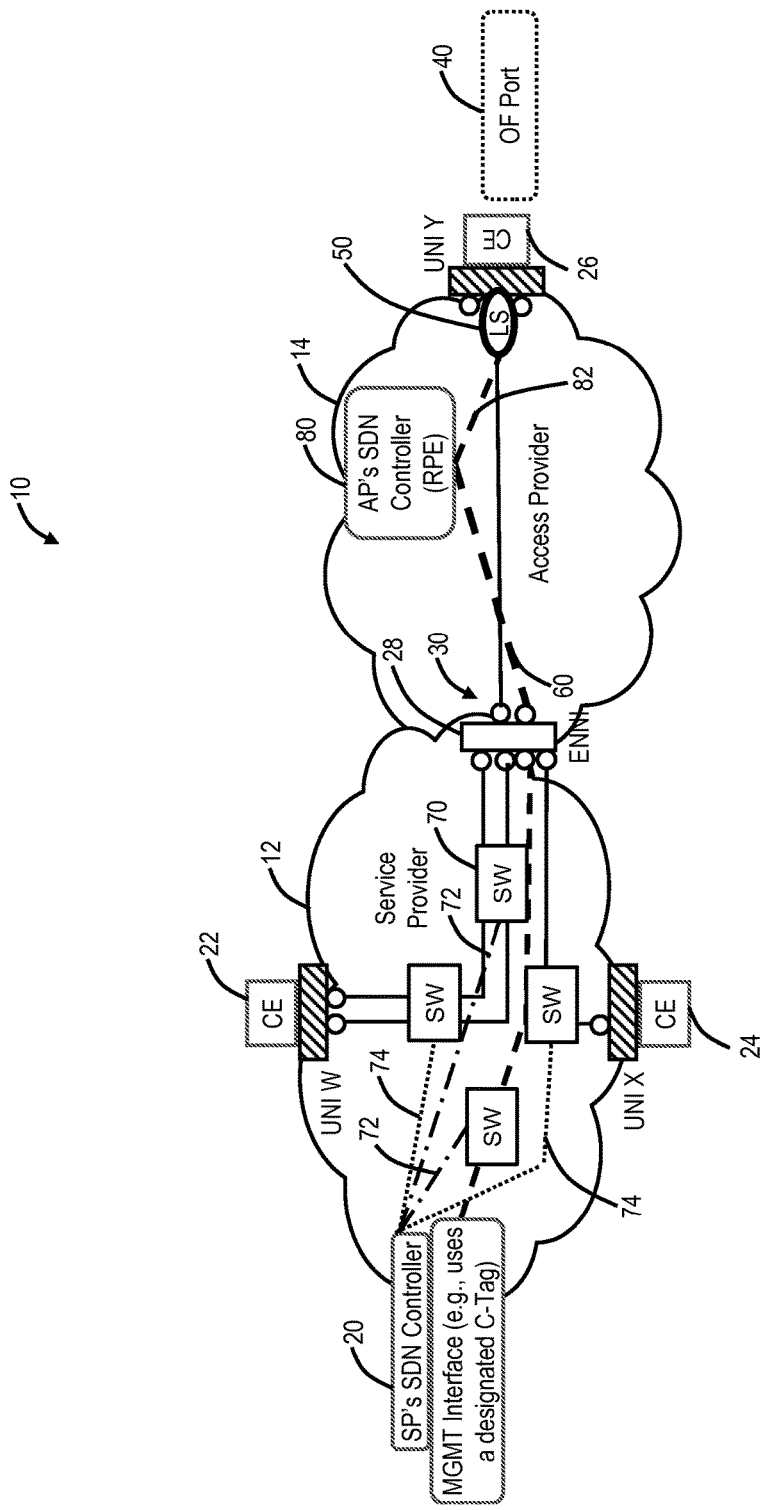
FIG. 7 is a network diagram illustrates the network of FIG. 1 illustrating an exemplary control scheme for SDN control of the logical switch in the local domain by a combination of the SDN controller in the local domain and an SDN controller in the remote domain.

Referring to FIG. 7, in an exemplary embodiment, a network diagram illustrates the network 10 illustrating an exemplary control scheme for SDN control of the logical switch 50 in the domain 14 by a combination of the SDN controller 20 in the domain 12 and an SDN controller 80 in the domain 14. The exemplary embodiment of FIG. 7 is similar to the exemplary embodiment of FIG. 4, but with a combination of control by the SDN controllers 20, 80. In an exemplary embodiment, the SDN controller 20 also controls resource reservation for the control channel 60 at the intermediate switches using, e.g., OpenFlow control (labeled as lines 72). In another exemplary embodiment, the SDN controller 20 controls resource reservation for the data flow as well as the control channel 60 using, e.g., OpenFlow control (labeled as lines 74).

Figure 8:
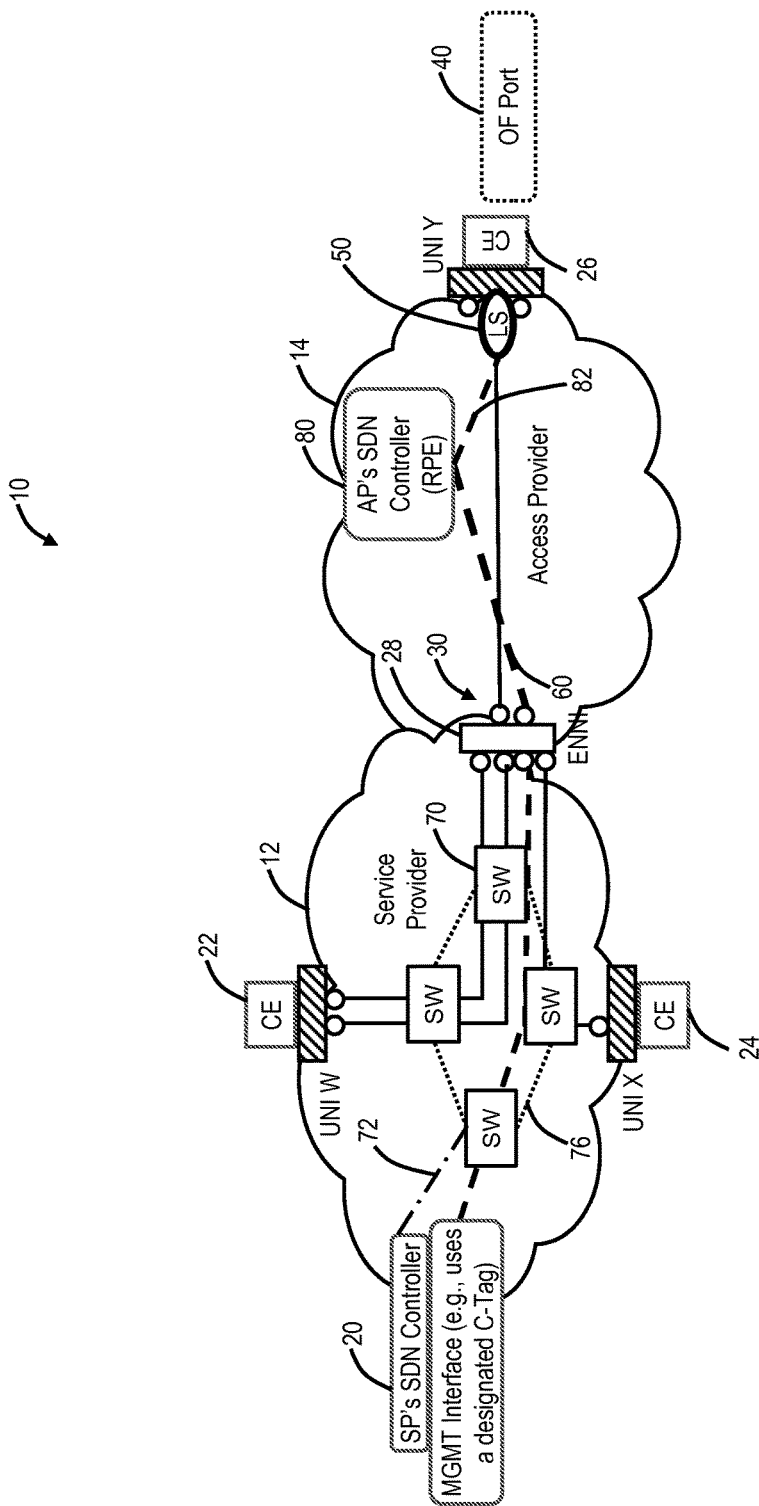
FIG. 8 is a network diagram illustrates the network of FIG. 1 illustrating another exemplary control scheme for SDN control of the logical switch in the local domain by a combination of the SDN controller in the local domain and an SDN controller in the remote domain.

Referring to FIG. 8, in an exemplary embodiment, a network diagram illustrates the network 10 illustrating another exemplary control scheme for SDN control of the logical switch 50 in the domain 14 by a combination of the SDN controller 20 in the domain 12 and an SDN controller 80 in the domain 14. The exemplary embodiment of FIG. 8 is similar to the exemplary embodiment of FIG. 5, but with a combination of control by the SDN controllers 20, 80. In this exemplary embodiment, the SDN controller 20 controls the reservation of resources at the intermediate switches 70 by acting as a Path Computation and Control Element (PCCE), computing the path and sending the allocation request to the head-end switch (labeled as line 72), and then relying on existing distributed control plane (labeled as lines 76) to carry out the allocation request within the network.

Figure 9:
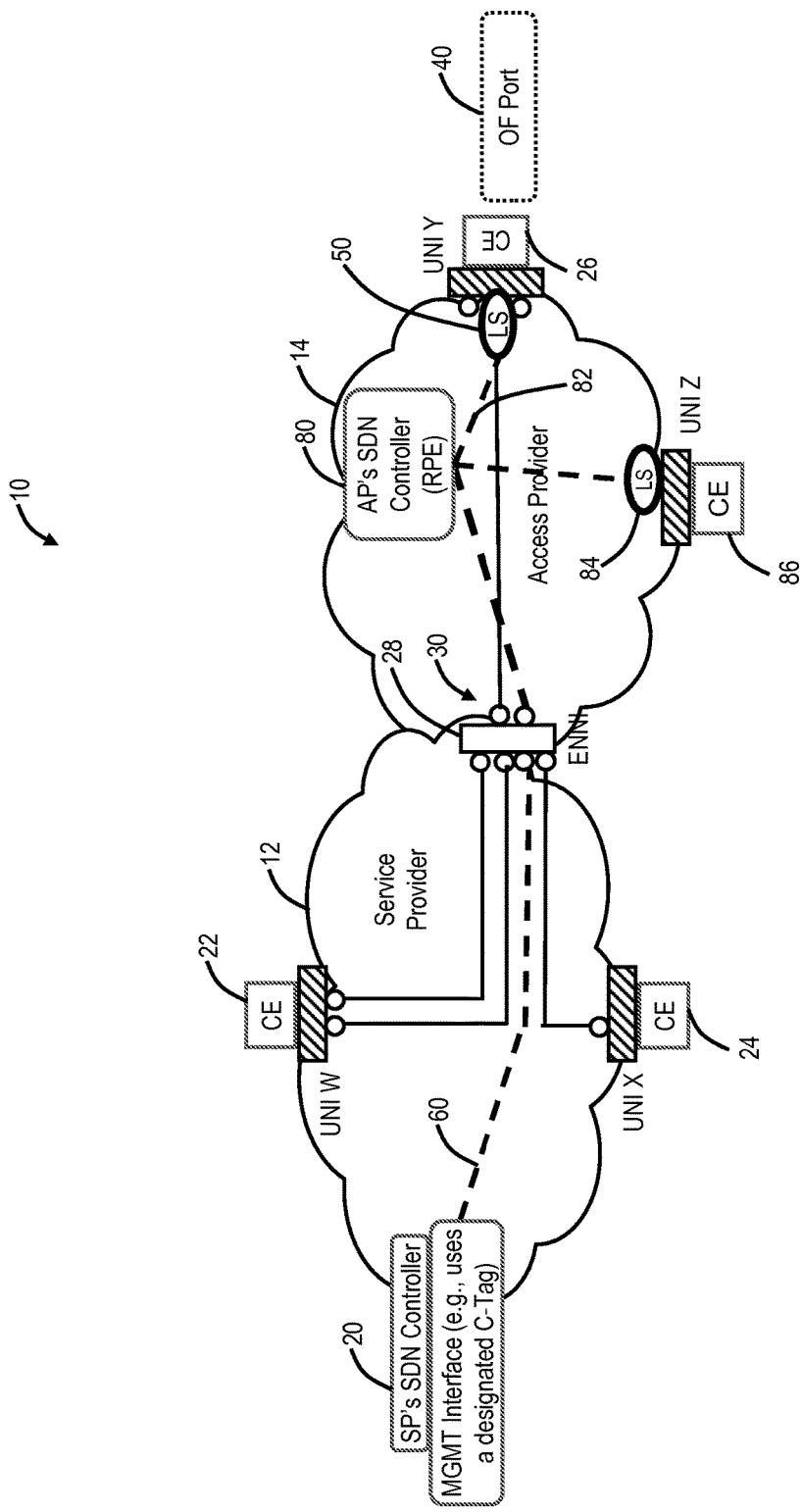
FIG. 9 is a network diagram illustrates the network of FIG. 1 illustrating instantiation of a new logical switch at a CE in the remote domain and with SDN control of the logical switches in the remote domain by a combination of the SDN controller in the local domain and an SDN controller in the remote domain.

Referring to FIG. 9, in an exemplary embodiment, a network diagram illustrates the network 10 illustrating instantiation of a new logical switch 84 at a CE 86 in the domain 14 and with SDN control of the logical switches 50, 84 in the domain 14 by a combination of the SDN controller 20 in the domain 12 and an SDN controller 80 in the domain 14. In this exemplary embodiment, the SDN controller 20 specifies coordinates identifying the UNI Z interface (interface to customer Z) to the SDN controller 80, and the SDN controller 80 instantiates the logical switch 84 at the UNI Z. In another exemplary embodiment, the SDN controller 20 specifies the UNI Z coordinates and the domain 12 allows the domain 14 to instantiate a Virtual Network Function (VNF) with a logical switch capability at the UNI Z, using NFV mechanisms.

The new logical switch 84 is controlled by the SDN controller 20. In an exemplary embodiment, there is a direct OpenFlow control channel 60 enabled from the SDN controller 20 to the new logical switch 84. In another exemplary embodiment, the SDN controller 80 acts as a proxy between the SDN controller 20 and the logical switches 50, 84. Specifically, the systems and method contemplate various control relationships between the SDN controller 20 and the logical switches 50, 84. In an exemplary embodiment, there is a simple 1:1 relationship between the SDN controller 20 and individual logical switches 50, 84 (or its control agent). In another exemplary embodiment, a more indirect 1:N relationship is where the domain 14 instantiates a Remote Processing Entity (RPE) such as the SDN controller 80 for N logical switches, and the SDN controller 20 interacts with the local RPE in the domain 14, which acts as a proxy for control messages between the SDN controller 20 and the N logical switches. Thus, each of the logical switches 50, 84 in the domain 14 are assigned to the SDN controller 20 either directly (1:1) or through the RPE (1:N) and configured so that it can establish an association with its SDN controller 80.

The domain 14 can instantiate a Remote Management Interface (RMI) between the RPE and the ENNI boundary with the domain 12 that supports SDN logical switch control functions. The domain 12 can control the logical switches 50, 84 via the RMI between the SDN controller 20 and the SDN controller 80 where the logical switches 50, 84 (i.e., the associated ports) attributes and possible parameter values might be mutually agreed to a priori or dynamically requested/accepted through the RMI. Also, the domain 12 can also cause instantiation of the logical switch 84 by specifying some 'coordinates' (e.g., at a UNI location) with the RPE in the domain 14 completing/rejecting such requests on behalf of the SDN controller 20. In another example, the logical switches 50, 84 can be a Virtual Network Function that is instantiated, with the agreement of the domain 14, in a general purpose processor using Network Functions Virtualization techniques. The VNF provides packet processing and forwarding functionality under the control of the OpenFlow channel 60 to the SDN controller 20.

Figure 10:
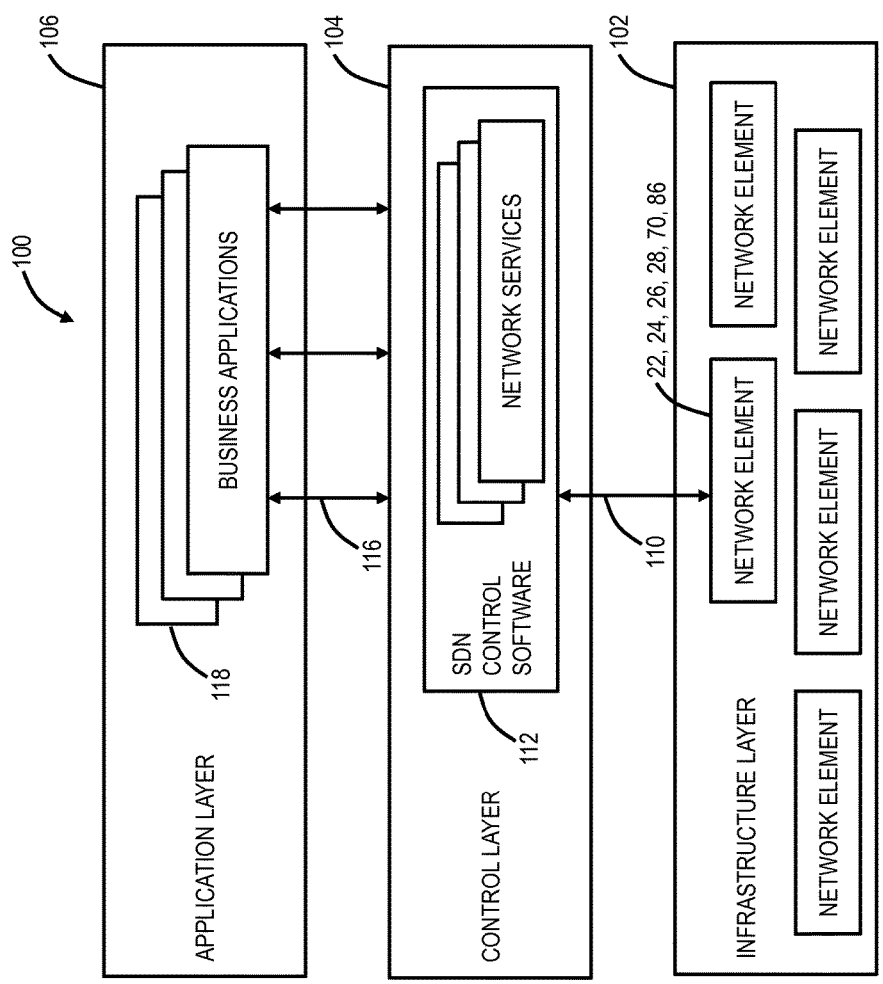
FIG. 10 is a block diagram of functional/logical components of an SDN environment.

Referring to FIG. 10, in an exemplary embodiment, a block diagram illustrates functional/logical components of an SDN environment 100. The SDN environment 100 includes a programmable infrastructure layer 102, a control layer 104, and an application layer 106. The programmable infrastructure layer 102 includes network devices such as the network elements including the CEs 22, 24, 26, the node 28, the switches 70, and the CE 86, and other components in the network 10 and is communicatively coupled to the control layer 104 via a control plane interface 110 such as OpenFlow, for example, or any other SDN protocol. The control layer 104 facilitates communication between the application layer 106 and the network elements 14 located in the programmable infrastructure layer 102. The control layer 104 includes SDN control software 112 which control a plurality of network services including services outside the domain 12 to the domain 14. The control layer 104 provides SDN functionality to manage network services through the abstraction of lower level functionality. For example, the SDN control plane can be implemented in full or in part through the control layer 104. The application layer 106 communicates with the control layer 104 through various Application Programming Interfaces (APIs) 116. The application layer 106 provides end user connectivity to the SDN such as software modules and/or functions responsible for creating desired path and flow connections on the physical network through various business applications 118.

Figure 11:
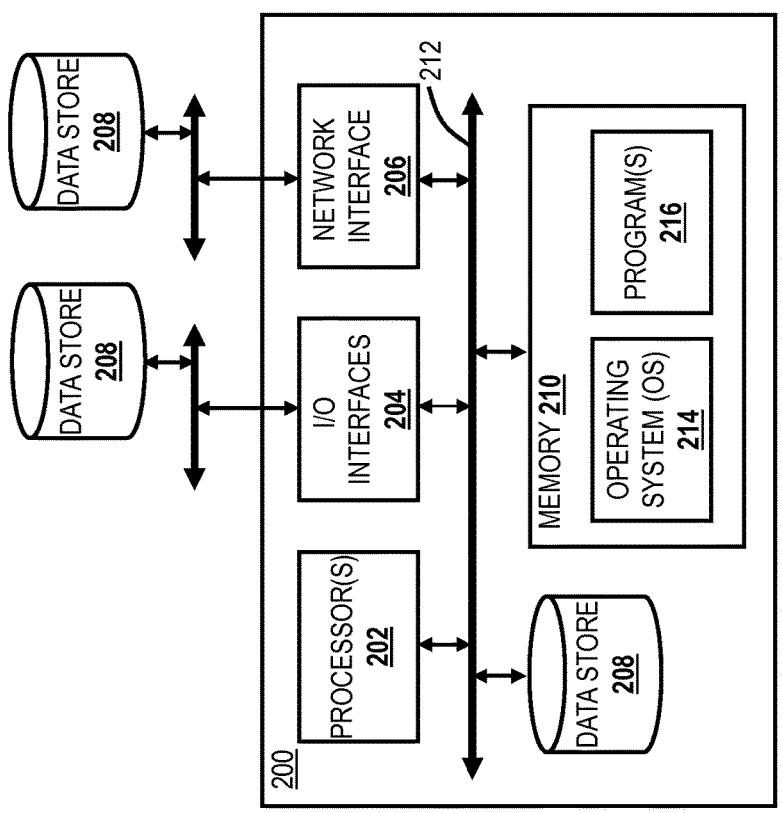
FIG. 11 is a block diagram of a server for the implementing the SDN controllers and the various processes described herein.

Referring to FIG. 11, in an exemplary embodiment, a block diagram illustrates a server 200 such as for the implementing the SDN controllers 20, 80, and the various processes described herein. The server 200 can be a digital computer that, in terms of hardware architecture, generally includes a processor 202, input/output (I/O) interfaces 204, a network interface 206, a data store 208, and memory 210. It should be appreciated by those of ordinary skill in the art that FIG. 11 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 can include address, control, and/or data connections to enable appropriate communications among the components above.

The processor 202 is a hardware device for executing software instructions. The processor 202 can be any custom made or commercially available processor, a central processing unit (CPU), graphics processing units (GPUs), an auxiliary processor among several processors associated with the server 200, a semiconductor based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 can be used to receive user input from and/or for providing system output to one or more devices or components. User input can be provided via, for example, a keyboard, touchpad, and/or a mouse. System output can be provided via a display device and a printer (not shown). I/O interfaces 204 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 can be used to enable the server 200 to communicate on a network. The network interface 206 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 206 can include address, control, and/or data connections to enable appropriate communications on the network. A data store 208 can be used to store data. The data store 208 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 can incorporate electronic, magnetic, optical, and/or other types of storage media. In one example, the data store 208 can be located internal to the server 200 such as, for example, an internal hard drive connected to the local interface 212 in the server 200. Additionally in another embodiment, the data store 208 can be located external to the server 200 such as, for example, an external hard drive connected to the I/O interfaces 204 (e.g., SCSI or USB connection). In a further embodiment, the data store 208 can be connected to the server 200 through a network, such as, for example, a network-attached file server.

The memory 210 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 can incorporate electronic, magnetic, optical, and/or other types of storage media. Note that the memory 210 can have a distributed architecture, where various components are situated remotely from one another, but can be accessed by the processor 202. The software in memory 210 can include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Figure 12:
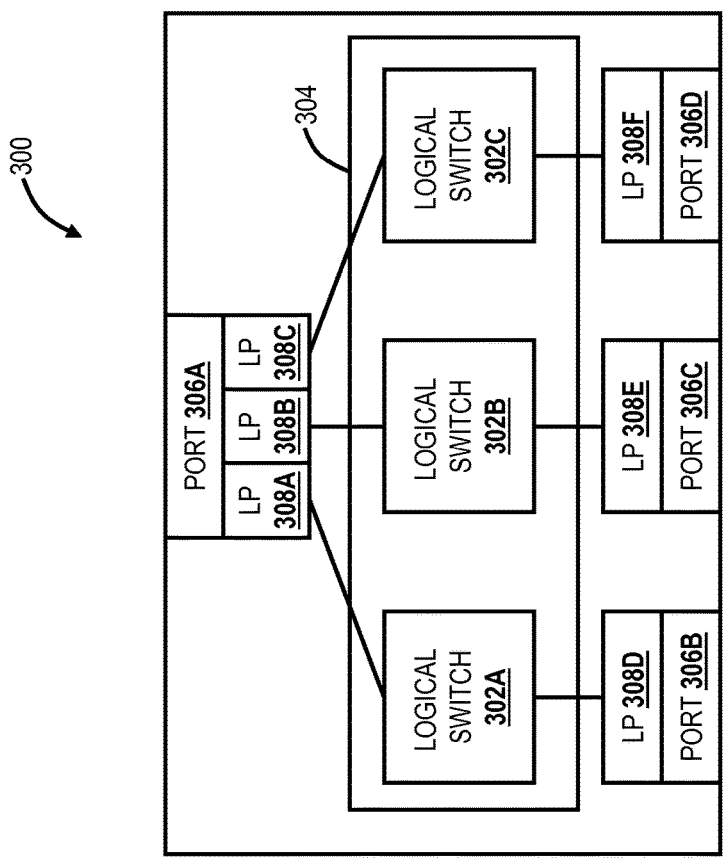

Referring to FIG. 12, in an exemplary embodiment, a block diagram illustrates an exemplary implementation of a switch 300 which can be used to realize the CEs, 22, 24, 26, 86. The switch 300 include three logical switches 302A, 302B, 302C. Again, the logical switches 302A, 302B, 302C are a logical switch element, a logical switch entity, a virtual switch, etc. which represents a logical partition of a physical switch 304 into separate switching domains; each of the logical switches 302A, 302B, 302C forward traffic independently of the others, providing a unique mechanism for isolating user traffic that is superior to other available techniques. In an exemplary aspect, the systems and methods described herein propose to expose one or more of the logical switches 302A, 302B, 302C to control via SDN from an outside domain. The switch 300 also include ports 306A, 306B, 306C, 306D each including one or more logical ports (LP) 308 (labeled as 308A-308F). The ports 306 are physical ports; in this example, the port 306A can be a Network-Network Interface (NNI) port, connecting to the domain 14. The ports 306B, 306C, 306D can be User-Network Interface (UNI) ports, with the associated logical ports 308D, 308E, 308F forming the OpenFlow ports 40 connected to the end customers in the domain 14.

The switch 300 receives data packets on the ports 306 and forwards each data packet to a different port 306, 308 than it was received on according to a destination address contained within each data packet. The switch 300 uses the logical switches 302A, 302B, 302C to segregate data packets within the switch 300, such as based on identifiers, labels, or tags. The switch 300 can include a single logical switch 302 or a plurality of logical switches 302. In fact, the number of logical switches 302 may change over time according to a configuration provided by the SDN controllers 20, 80.

Each logical switch 302A, 302B, 302C includes two or more interfaces on which data packets may be sent and received. The logical switch 302A, 302B, 302C forwards a data packet received on one of its interfaces to one of its other interfaces based on the data packet's destination address. Once a data packet has been received on a logical switch interface, it is confined to that logical switch 302A, 302B, 302C and prevented from being forwarded to an interface associated with a different logical switch 302A, 302B, 302C. Each port 306 receives data packets and transmits data packets. Although the switch 300 is depicted as having four ports 306, the switch 300 could have any number of ports 306. Each port 306 may include one or more of the logical ports 308. For example, the port 306A includes three logical ports 308A, 308B, 306C; the port 306B includes the logical port 308D; the port 306C includes the logical port 308E; and the port 306D includes the logical port 308F.

Each port 306 is logically divided into one or more logical ports 308 so that all data packets having a particular identifier, label, or tag, or portion of a tag, that are sent or received on the port 306 are assigned to a particular logical port 308. Thus, data packets having a first tag or portion of a tag that are received on a port belong to a first logical port and data packets having a second tag or portion of a tag that are received on the same port belong to a second logical port. Of note, the switch 300 is presented for illustration purposes, and those of ordinary skill in the art will recognize the systems and methods described herein contemplate other types of network elements, nodes, devices, etc.

For SDN remote control, the switch 300 can be used to implement the CE 26. The logical switches 302A, 302B, 302C, while located in the CE 26 in the domain 14, are controlled by the SDN controller 20 in the domain 12. That is, the logical switches 302A, 302B, 302C can form the logical switches 50, 84 described above, and the logical ports 308D, 308E, 308F can form the OpenFlow ports 40. That is, the logical switches 302A, 302B, 302C can be OFLSs. With the SDN controller 20, the SP is able to control attributes of the logical switches 302A, 302B, 302C and/or the ports 308 as well as MEF services provisioned on the UNI ports.

Figure 13:
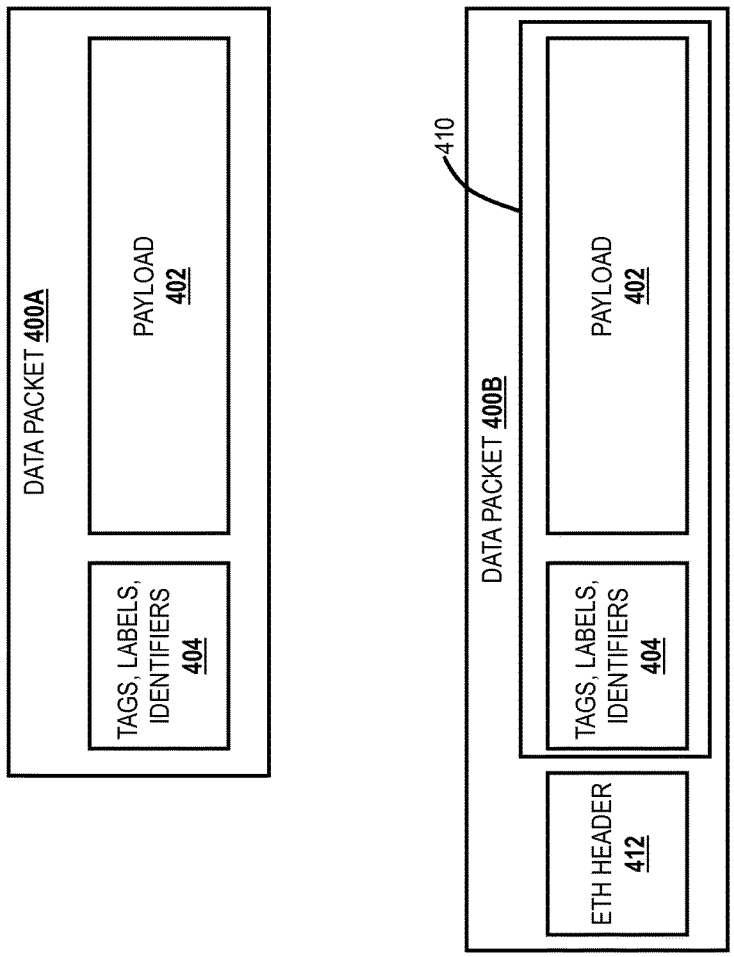
FIG. 13 are block diagrams of exemplary data packets for communication between the SDN controller and the logical switch in the networks described herein.

Referring to FIG. 13, in exemplary embodiments, block diagrams illustrate exemplary data packets 400A, 400B for communication between the SDN controller 20 and the logical switch 50. The data packets 400A, 400B are illustrated in a simplified form for clarity, and may include various additional fields and the like. The data packet 400A can be provided in the domain 12, i.e., in the SP's network, whereas the data packet 400B can be provided in the domain 14, i.e., the AP's network. The data packet 400A includes payload 402 and tags, labels, and/or identifiers 404, referred to herein as tags 404. The payload 402 includes a message, or portion of a message being relayed by the data packet 400A. The tag 404 and additional portions of the data packet other than the payload 402 are overhead information added to the data packet 400A to ensure that the payload gets to the proper destination. Typically, the payload 402 portion of the data packet 400A is much larger than the overhead portions.

The data packet 400B includes similar the payload 402 and the tags 404 as in the data packet 400A, but these are in a payload 410. The data packet 400B also includes an Ethernet header 412. In the domain 14, the data packet 400B appears as a standard Ethernet packet with the header 412 being recognized in the domain 14. The tags 404 are encapsulated in the payload 410 in the data packet 400B. The transition between the data packet 400A and the data packet 400B can occur at the ENNI ports 30 or the like. The data packets 400A, 400B can conform to various standards such as, without limitation, IEEE 802.1 Q, IEEE 802.1 ad, MPLS, etc.

Figure 14:
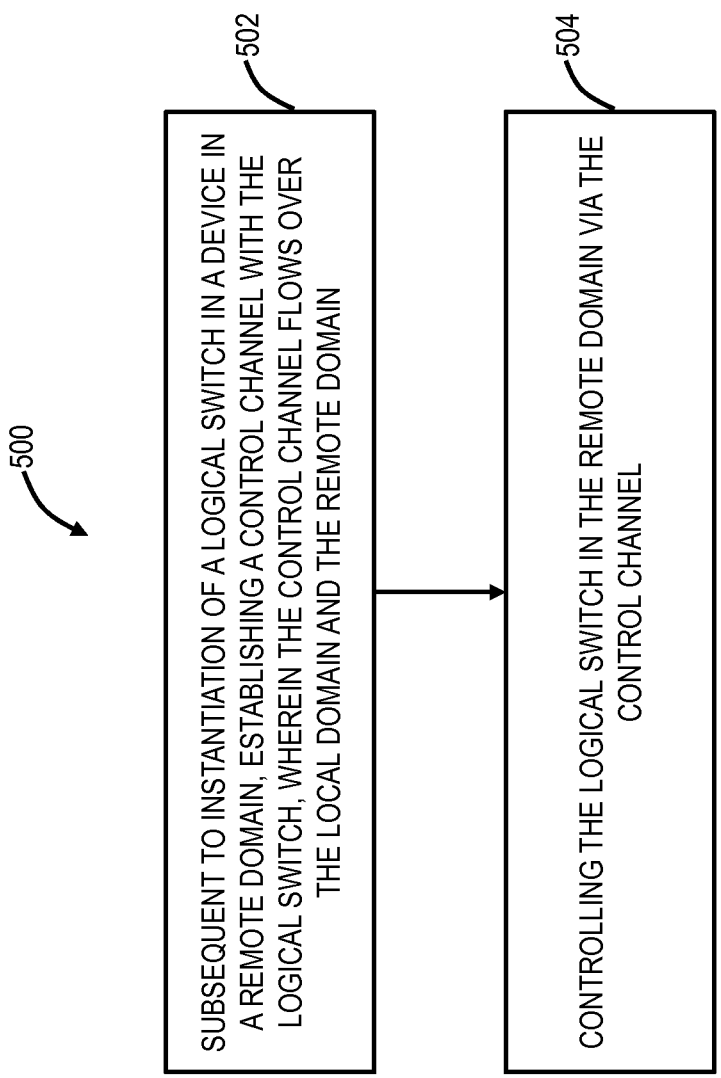
FIG. 14 is a flowchart of a process for Software Defined Networking (SDN) control of remote services in a remote domain by an SDN controller associated with a local domain.

Referring to FIG. 14, in an exemplary embodiment, a flowchart illustrates a process 500 for Software Defined Networking (SDN) control of remote services in a remote domain by an SDN controller associated with a local domain. For example, the process 500 can be implemented by the SDN controller 20 in the network 10. The process 500 includes subsequent to instantiation of a logical switch in a device in a remote domain, establishing a control channel with the logical switch, wherein the control channel flows over the local domain and the remote domain (step 502) and controlling the logical switch in the remote domain via the control channel (step 504). The logical switch can be an OpenFlow Logical Switch, and the control channel can be an OpenFlow control channel. Optionally, the OpenFlow Logical Switch can support a required Table Typing Pattern that specifies a table structure in OpenFlow to support a service. Alternatively, the logical switch can be implemented by a processor executing a Virtual Network Function (VNF).

The control channel traverses External Network-Network Interface (ENNI) ports between the local domain and the remote domain, and the control channel can include one or more of an OpenFlow control channel, an Ethernet Virtual Connection, an Internet Protocol (IP) tunnel, and an Optical channel Data Unit (ODU) connection between the SDN controller and the logical switch. The controlling of the logical switch can include one or more of controlling resource reservation for the control channel by the SDN controller, controlling resource reservation for the control channel and data flow by the SDN controller, and controlling resource reservation in the local domain by sending allocation requests to a device in the local domain and relying on a control plane in the local domain to carry out the allocation requests.

Optionally, the logical switch can be controlled by the SDN controller and in combination with a second controller in the remote domain, the second controller acts as a Remote Management Interface for the control channel. Alternatively, the logical switch can be controlled by the SDN controller and in combination with a second controller in the remote domain, the second controller acts as a Remote Processing Element that proxies control messages from the control channel. The instantiation of the logical switch can be performed by one of the SDN controller identifying a User-Network Interface (UNI) port with a second controller in the remote domain to cause the second controller to instantiate the logical switch at the UNI port, and the SDN controller instantiating a Virtual Network Function (VNF) for the logical switch at the UNI port.

Thus, the process 500 enables the use of SDN between an SDN controller in one domain and a logical switch in another domain, in order to control the services being offered by the SP to the remote user. The control of the logical switch includes the ability to modify many different packet services offered to the remote user by changing the forwarding table and packet or circuit processing of information being sent by or sent to the user, including change of encapsulation or adaptation of layer.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Software Defined Networking (SDN) controller associated with a local domain and configured to control remote services in a remote domain, the SDN controller comprising:
   a network interface communicatively coupled to the local domain and to the remote domain via a control channel, wherein the local domain is a separate switching domain from the remote domain and the SDN controller is located in the local domain and controls the remote services in the remote domain;
   a processor communicatively coupled to the network interface; and
   memory storing instructions that, when executed, cause the processor to
      subsequent to instantiation of a logical switch in a device in the remote domain, establish the control channel with the logical switch, wherein the control channel flows over the local domain and the remote domain providing connectivity to the SDN controller located in the local domain to the logical switch located in the remote domain, wherein the control channel traverses External Network-Network Interface (ENNI) ports between the local domain and the remote domain, and control the logical switch in the remote domain via the control channel.

2. The SDN controller of claim 1, wherein the logical switch is an OpenFlow Logical Switch and the control channel is an OpenFlow control channel.

3. The SDN controller of claim 2, wherein the OpenFlow Logical Switch supports a required Table Typing Pattern that specifies a table structure in OpenFlow to support a service.

4. The SDN controller of claim 1, wherein the logical switch is implemented by a processor executing a Virtual Network Function (VNF).

5. The SDN controller of claim 1, wherein the control channel comprises one or more of an OpenFlow control channel, an Ethernet Virtual Connection, an Internet Protocol (IP) tunnel, and an Optical channel Data Unit (ODU) connection between the SDN controller and the logical switch.

6. The SDN controller of claim 1, wherein the control of the logical switch comprises one or more of
control of resource reservation for the control channel by the SDN controller,
control of resource reservation for the control channel and data flow by the SDN controller, and
control of resource reservation in the local domain by sending allocation requests to a device in the local domain and relying on a control plane in the local domain to carry out the allocation requests.

7. The SDN controller of claim 1, wherein the logical switch is controlled by the SDN controller and in combination with a second controller in the remote domain, the second controller acts as a Remote Management Interface for the control channel.

8. The SDN controller of claim 1, wherein the logical switch is controlled by the SDN controller and in combination with a second controller in the remote domain, the second controller acts as a Remote Processing Element that proxies control messages from the control channel.

9. The SDN controller of claim 1, wherein the instantiation of the logical switch is performed by one of
the SDN controller configured to identify a User-Network Interface (UNI) port with a second controller in the remote domain to cause the second controller to instantiate the logical switch at the UNI port, and
the SDN controller configured to instantiate a Virtual Network Function (VNF) for the logical switch at the UNI port.

10. The SDN controller of claim 1, wherein the control channel is one of
a separate traffic class, and
combined with other data flows as another bandwidth profile flow within an envelope.

11. A method for Software Defined Networking (SDN) control of remote services in a remote domain by an SDN controller associated with a local domain, the method comprising:
subsequent to instantiation of a logical switch in a device in the remote domain, establishing a control channel with the logical switch, wherein the control channel flows over the local domain and the remote domain providing connectivity to the SDN controller located in the local domain to the logical switch located in the remote domain, wherein the SDN controller is connected to the local domain and to the remote domain via the control channel, and wherein the local domain is a separate switching domain from the remote domain, wherein the control channel traverses External Network-Network Interface (ENNI) ports between the local domain and the remote domain; and
controlling the logical switch in the remote domain via the control channel.

12. The method of claim 11, wherein the logical switch is an OpenFlow Logical Switch and the control channel is an OpenFlow control channel.

13. The method of claim 12, wherein the OpenFlow Logical Switch supports a required Table Typing Pattern that specifies a table structure in OpenFlow to support a service.

14. The method of claim 11, wherein the logical switch is implemented by a processor executing a Virtual Network Function (VNF).

15. The method of claim 11, wherein the control channel comprises one or more of an OpenFlow control channel, an Ethernet Virtual Connection, an Internet Protocol (IP) tunnel, and an Optical channel Data Unit (ODU) connection between the SDN controller and the logical switch.

16. The method of claim 11, wherein the controlling of the logical switch comprises one or more of
controlling resource reservation for the control channel by the SDN controller,
controlling resource reservation for the control channel and data flow by the SDN controller, and
controlling resource reservation in the local domain by sending allocation requests to a device in the local domain and relying on a control plane in the local domain to carry out the allocation requests.

17. The method of claim 11, wherein the logical switch is controlled by the SDN controller and in combination with a second controller in the remote domain, the second controller acts as a Remote Management Interface for the control channel.

18. The method of claim 11, wherein the logical switch is controlled by the SDN controller and in combination with a second controller in the remote domain, the second controller acts as a Remote Processing Element that proxies control messages from the control channel.

19. The method of claim 11, wherein the instantiation of the logical switch is performed by one of
the SDN controller identifying a User-Network Interface (UNI) port with a second controller in the remote domain to cause the second controller to instantiate the logical switch at the UNI port, and
the SDN controller instantiating a Virtual Network Function (VNF) for the logical switch at the UNI port.

20. A switch located in a remote domain and controlled by a Software Defined Networking (SDN) controller located in a local domain, the switch comprising:
one or more logical switches, each of the one or more logical switches is a logical partition of a physical switch segmented into separate switching domains, each of the one or more logical switches forward traffic independently of one another;
wherein, subsequent to instantiation of a logical switch of the one or more logical switches, a control channel is established with the SDN controller in the local domain, wherein the control channel flows over the local domain and the remote domain providing connectivity to the SDN controller located in the local domain to the logical switch located in the remote domain, and
wherein the logical switch is controlled by the SDN controller in the local domain via the control channel, and wherein the local domain is a separate switching domain from the remote domain, and wherein the control channel traverses External Network-Network Interface (ENNI) ports between the local domain and the remote domain.

* * * * *